US011070304B1

(12) United States Patent
Levi et al.

(10) Patent No.: US 11,070,304 B1
(45) Date of Patent: Jul. 20, 2021

(54) PHYSICAL HARDWARE CLOCK CHAINING

(71) Applicant: MELLANOX TECHNOLOGIES, LTD., Yokneam (IL)

(72) Inventors: Dotan David Levi, Kiryat Motzkin (IL); Liron Mula, Ramat Gan (IL); Avraham Ganor, Shoham (IL); Avi Urman, Yokneam Illit (IL); Aviad Raveh, Bat Hefer (IL); Yuval Itkin, Zoran (IL); Oren Matus, Kfar Yehezkel (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/799,873

(22) Filed: Feb. 25, 2020

(51) Int. Cl.
*H04J 3/06* (2006.01)

(52) U.S. Cl.
CPC .......... *H04J 3/0697* (2013.01); *H04J 3/0667* (2013.01)

(58) Field of Classification Search
None
See application file for complete search history.

(56) References Cited

U.S. PATENT DOCUMENTS

| 5,392,421 A | 2/1995 | Lennartsson |
| 5,402,394 A | 3/1995 | Turski |
| 5,416,808 A | 5/1995 | Witsaman et al. |
| 5,564,285 A | 10/1996 | Jurewicz et al. |
| 5,896,524 A | 4/1999 | Halstead, Jr. et al. |
| 6,055,246 A | 4/2000 | Jones |
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |

(Continued)

FOREIGN PATENT DOCUMENTS

| CN | 106817183 A | 6/2017 |
| EP | 1215559 B1 | 9/2007 |

(Continued)

OTHER PUBLICATIONS

Dlugy-Hegwer et al., "Designing and Testing IEEE 1588 Timing Networks", Symmetricom, pp. 1-10, Jan. 2007.

(Continued)

*Primary Examiner* — Anh Vu H Ly
(74) *Attorney, Agent, or Firm* — Kligler & Associates Patent Attorneys Ltd (57) ABSTRACT

In one embodiment, a computer apparatus includes a first NIC including at least one network interface port to transfer data with a first packet-data network (PDN) including a master clock to provide a clock synchronization signal S1, a first physical hardware clock (PHC) to maintain a time value T1 responsively to S1, and a first clock controller to generate a clock synchronization signal S2 responsively to S1, S2 having a frequency set responsively to S1, and send S2 over a connection to a second NIC including at least one network interface port to transfer data with a second PDN, a second PHC, and a second clock controller to receive S2, update the second PHC with a time value T2 responsively to S2, send another clock synchronization signal to network nodes in the second PDN responsively to T2, the second NIC acting as a master clock in the second PDN.

22 Claims, 7 Drawing Sheets

(56) References Cited

U.S. PATENT DOCUMENTS

| | | |
|---|---|---|
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,370,675 B2 | 2/2013 | Kagan |
| 8,407,478 B2 | 3/2013 | Kagan et al. |
| 8,607,086 B2 | 12/2013 | Cullimore |
| 8,879,552 B2 | 11/2014 | Zheng |
| 9,344,265 B2 | 5/2016 | Karnes |
| 9,397,960 B2 | 7/2016 | Arad et al. |
| 10,027,601 B2 | 7/2018 | Narkis et al. |
| 10,054,977 B2 | 8/2018 | Mikhaylov et al. |
| 10,320,646 B2 | 6/2019 | Mirsky et al. |
| 2002/0027886 A1 | 3/2002 | Fischer et al. |
| 2004/0096013 A1 | 5/2004 | Laturell et al. |
| 2004/0153907 A1 | 8/2004 | Gibart |
| 2006/0109376 A1 | 5/2006 | Chaffee et al. |
| 2007/0104098 A1 | 5/2007 | Kimura et al. |
| 2007/0124415 A1 | 5/2007 | Lev-Ran et al. |
| 2008/0069150 A1 | 3/2008 | Badt et al. |
| 2013/0215889 A1 | 8/2013 | Zheng et al. |
| 2014/0153680 A1 | 6/2014 | Garg et al. |
| 2014/0185632 A1* | 7/2014 | Steiner .......... H04J 3/0658 370/503 |
| 2015/0318941 A1* | 11/2015 | Zheng .......... H04J 3/0641 370/503 |
| 2016/0110211 A1 | 4/2016 | Karnes |
| 2016/0315756 A1 | 10/2016 | Tenea et al. |
| 2017/0005903 A1 | 1/2017 | Mirsky |
| 2017/0214516 A1 | 7/2017 | Rivaud et al. |
| 2017/0331926 A1 | 11/2017 | Raveh et al. |
| 2017/0359137 A1* | 12/2017 | Butterworth .......... H04J 3/0661 |
| 2019/0007189 A1 | 1/2019 | Hossain et al. |
| 2019/0158909 A1 | 5/2019 | Kulkarni et al. |
| 2019/0319729 A1 | 10/2019 | Leong et al. |
| 2019/0379714 A1 | 12/2019 | Levi et al. |
| 2020/0304224 A1 | 9/2020 | Neugeboren |
| 2020/0331480 A1* | 10/2020 | Zhang .......... G06F 13/4282 |

FOREIGN PATENT DOCUMENTS

| | | |
|---|---|---|
| WO | 2012007276 A1 | 1/2012 |
| WO | 2013124782 A2 | 8/2013 |
| WO | 2013143112 A1 | 10/2013 |
| WO | 2014029533 A1 | 2/2014 |

OTHER PUBLICATIONS

Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.

Texas Instruments, "LMK05318 Ultra-Low Jitter Network Synchronizer Clock With Two Frequency Domains," Product Folder, pp. 1-86, Dec. 2018.

ITU-T recommendation, "G.8273.2/Y.1368.2—Timing characteristics of telecom boundary clocks and telecom time slave clocks", pp. 1-50, Jan. 2017.

IEEE Standard 1588™-2008: "IEEE Standard for a Precision Clock Synchronization Protocol for Networked Measurement and Control Systems", IEEE Instruments and Measurement Society, Revision of IEEE Standard 1588-2002, USA, pp. 1-289, Jul. 24, 2008.

Weibel et al., "Implementation and Performance of Time Stamping Techniques", 2004 Conference on IEEE 1588, pp. 1-29, Sep. 28, 2004.

Working Draft Project American National Standard T10/1799-D, "Information Technology—SCSI Block Commands—3 (SBC-3)", pp. 1-220, Revision 19, May 29, 2009.

"Infiniband Architecture: Specification vol. 1", pp. 1-1727, Release 1.2.1, Infiniband Trade Association, Nov. 2007.

Mellanox Technologies, "Mellanox ConnectX IB: Dual-Port InfiniBand Adapter Cards with PCI Express 2.0", pp. 1-2, USA, year 2008.

Gaist et al., U.S. Appl. No. 16/199,312, filed Nov. 26, 2018.

Almog et al U.S. Appl. No. 16/683,309, filed Nov. 14, 2019.

Wikipedia—"Precision Time Protocol", pp. 1-8, Aug. 24, 2019.

Levi et al., U.S. Appl. No. 16/779,611, filed Feb. 2, 2020.

U.S. Appl. No. 16/199,312 office action dated Feb. 14, 2020.

Lu et al., "A Fast CRC Update Implementation", Computer Engineering Laboratory, Electrical Engineering Department, pp. 113-120, Oct. 8, 2003.

Weibel, H., "High Precision Clock Synchronization according to IEEE 1588 Implementation and Performance Issues", Zurich University of Applied Sciences, pp. 1-9, Jan. 17, 2005.

\* cited by examiner

PHYSICAL HARDWARE CLOCK CHAINING

FIELD OF THE INVENTION

The present invention relates to computer networks, and in particular, but not exclusively, to synchronizing timing in computer networks.

BACKGROUND

In computer networks, each node (such as a switch or endpoint) typically has its own real-time clock. In many applications, it is desirable that the real-time clocks of different nodes be precisely synchronized. Such synchronization can be difficult to achieve, however, due to the latency and jitter involved in distributing clock synchronization messages among the nodes.

The Precision Time Protocol (PTP) was conceived as a solution to this problem. PTP is defined in IEEE standard 1588-2002, which is incorporated herein by reference. This protocol enables network nodes, using messaging between the nodes and a master device, to determine the offset of their respective clocks to levels of accuracy in the nanosecond range. For maximum accuracy in measuring the clock offsets, hardware-based time stamping is generally used, as described, for example, by Weibel and Bechaz in "Implementation and Performance of Time Stamping Techniques," 2004 Conference on IEEE 1588 (Sep. 28, 2004), which is incorporated herein by reference.

The IEEE 1588 standards describe a hierarchical master-slave architecture for clock distribution. Under this architecture, a time distribution system consists of one or more network segments, and one or more clocks. An ordinary clock is a device with a single network connection and is either the master or slave for a synchronization reference. A boundary clock (BC) has multiple network connections and accurately synchronizes one network segment to another. A synchronization master is selected for each network segment. The root timing reference is called the grandmaster (GM), which transmits synchronization information to clocks residing on its network segment. The boundary clocks with a presence on that segment then relay accurate time to the other segments to which they are also connected.

A network interface controller (NIC) device may include a single hardware clock, such as a Precision Time Protocol (PTP) hardware clock (PHC), or one hardware clock per Ethernet port. A PHC is a hardware clock (e.g., including an oscillator and a counter), which runs according to any suitable protocol or format, for example, but not limited to, PTP format. The PHC is synchronized to a master in the network. Each network host typically runs a clock synchronization client, e.g., a PTP client such as ptp41 in a Linux Kernel, which communicates with a BC or GM somewhere in the packet data network, for example, using PTP get messages to receive a time value from the BC or GM. The received time value may be used by the NIC to update its local PHC. In some applications the PHC of the NIC may discipline the system clock (x86) of the processing device which the NIC serves.

U.S. Pat. No. 8,370,675 to Kagan describes a method for clock synchronization which includes computing an offset value between a local clock time of a real-time clock circuit and a reference clock time, and loading the offset value into a register that is associated with the real-time clock circuit. The local clock time is then summed with the value in the register so as to give an adjusted value of the local clock time that is synchronized with the reference clock.

SUMMARY

There is provided in accordance with an embodiment of the present disclosure, a computer apparatus, including a first network interface controller including at least one first network interface port configured to transfer data with a first packet-data network (PDN), the first PDN including a master clock configured to provide a clock synchronization signal S1, a first connector configured to be connected to a connection, a first physical hardware clock (PHC) configured to maintain a time value T1 responsively to the clock synchronization signal S1, and a first clock controller configured to generate a clock synchronization signal S2 responsively to the received clock synchronization signal S1, the clock synchronization signal S2 having a frequency, which is set responsively to the received clock synchronization signal S1, and send the clock synchronization signal S2 over the first connector and over the connection to a second network interface controller, and the second network interface controller including at least one second network interface port configured to transfer data with a second PDN different from the first PDN, a second connector configured to be connected to the connection, a second PHC, and a second clock controller configured to receive the clock synchronization signal S2 from the second connector, update the second PHC with a time value T2 responsively to the received clock synchronization signal S2, send another clock synchronization signal to network nodes in the second PDN responsively to the time value T2 such that the second network interface controller is configured to act as a master clock in the second PDN.

Further in accordance with an embodiment of the present disclosure the connection includes a coaxial radio-frequency (RF) cable, the first connector includes a first coaxial RF connector configured to be connected to the coaxial RF cable, the first clock controller is configured to send the clock synchronization signal S2 over the first coaxial RF connector and over the coaxial RF cable, the second connector includes a second coaxial RF connector configured to be connected to the coaxial RF cable, and the second clock controller is configured to receive the clock synchronization signal S2 from the second coaxial RF connector.

Still further in accordance with an embodiment of the present disclosure, the apparatus includes the coaxial RF cable connected between the first coaxial RF connector and the second coaxial RF connector.

Additionally, in accordance with an embodiment of the present disclosure the first clock controller is configured to receive the clock synchronization signal S, and update the first PHC with the time value T1 responsively to the clock synchronization signal S1.

Moreover, in accordance with an embodiment of the present disclosure the first clock controller is configured to read the time value T1 from the first PHC, and generate the clock synchronization signal S2 responsively to the read time value T1.

Further in accordance with an embodiment of the present disclosure the first clock controller is configured to encode frequency information in the clock synchronization signal S2, and encode phase information in the clock synchronization signal S2 using at least one marking pulse, and the second clock controller is configured to decode the frequency information from the clock synchronization signal S2, and decode the phase information from the clock synchronization signal S2 responsively to the at least one marking pulse.

Still further in accordance with an embodiment of the present disclosure the first clock controller is configured to generate a phase value signal indicative of a phase value of the time value T1, and send the phase value signal to the second clock controller out-of-band with the clock synchronization signal S2, and the second clock controller is configured to time an update of the time value T2 responsively to the phase value where the at least one marking pulse is detected in the clock synchronization signal S2.

Additionally, in accordance with an embodiment of the present disclosure, the apparatus includes a central processing unit, wherein the first clock controller is configured to send the phase value signal to the second clock controller via the CPU.

Moreover in accordance with an embodiment of the present disclosure the first clock controller is configured to encode the phase information in the clock synchronization signal S2 using the at least one marking pulse by modulating a width and/or an amplitude of at least one pulse of the clock synchronization signal S2, and the second clock controller is configured to measure a width and/or amplitude of pulses in the clock synchronization signal S2 to identify the at least one marking pulse.

Further in accordance with an embodiment of the present disclosure the first clock controller is configured to encode the phase information in the clock synchronization signal S2 using a pattern of marking pulses responsively to a marking function, and the second clock controller is configured to find a section of the clock synchronization signal S2 matching the pattern of marking pulses within a predefined correlation threshold, and time the update of the time value T2 responsively to the phase value where the matching section is detected in the clock synchronization signal S2.

Still further in accordance with an embodiment of the present disclosure the marking function is based on a Walsh function.

Additionally in accordance with an embodiment of the present disclosure the second network interface controller includes another connector configured to be connected to a second connection, and the second clock controller is configured to provide a clock synchronization signal S3 responsively to the clock synchronization signal S2, and send the clock synchronization signal S3 over the other connector and over the second connection, the apparatus further including a third network interface controller including a third connector configured to be connected to the second connection, at least one third network interface port configured to transfer data with a third PDN, a third PHC, and a third clock controller configured to receive the clock synchronization signal S3 from the third connector, update the third PHC with a time value T3 responsively to the received clock synchronization signal S3, send a clock synchronization signal to network nodes in the third PDN responsively to the time value T3 such that the third network interface controller is configured to act as a master clock in the third PDN.

There is also provided in accordance with another embodiment of the present disclosure, a method of time synchronization, including connecting a first network interface controller with a second network interface controller using a connection, connecting at least one first network interface port of the first network interface controller to a first packet-data network (PDN), connecting at least one second network interface port of the second network interface controller to a second PDN, receiving a clock synchronization signal S1 from a master clock in the first PDN over the at least one first network interface port, generating by the first network interface controller a clock synchronization signal S2 responsively to the received clock synchronization signal S1, the clock synchronization signal S2 having a frequency, which is set responsively to the received clock synchronization signal S1, sending the clock synchronization signal S2 to the second network interface controller, receiving the clock synchronization signal S2 by the second network interface controller, updating a physical hardware clock (PHC) in the second network interface controller with a time value responsively to the received clock synchronization signal S2, and sending another clock synchronization signal to network nodes in the second PDN responsively to the time value such that the second network interface controller acts as a master clock in the second PDN.

Moreover, in accordance with an embodiment of the present disclosure, the method includes connecting the first network interface controller with the second network interface controller using a coaxial radio-frequency (RF) cable, and wherein the sending includes sending the clock synchronization signal S2 over the coaxial RF cable.

Further in accordance with an embodiment of the present disclosure, the method includes updating a PHC of the first network interface with a time value responsively to the clock synchronization signal S1.

Still further in accordance with an embodiment of the present disclosure, the method includes reading the time value from the PHC of the first network interface controller, and generating the clock synchronization signal S2 responsively to the read time value.

Additionally in accordance with an embodiment of the present disclosure, the method includes encoding by the first network interface controller frequency information in the clock synchronization signal S2, and phase information in the clock synchronization signal S2 using at least one marking pulse, and decoding by the second network interface controller the frequency information from the clock synchronization signal S2, and the phase information from the clock synchronization signal S2 responsively to the at least one marking pulse.

Moreover in accordance with an embodiment of the present disclosure, the method includes generating by the first network interface controller a phase value signal indicative of a phase value, sending the phase value signal to the second network interface controller out-of-band with the clock synchronization signal S2, and timing an update of the time value responsively to the phase value where the at least one marking pulse is detected in the clock synchronization signal S2.

Further in accordance with an embodiment of the present disclosure the encoding includes encoding the phase information in the clock synchronization signal S2 using the at least one marking pulse by modulating a width and/or an amplitude of at least one pulse of the clock synchronization signal S2, and the method further including measuring, by the second network interface controller, a width and/or amplitude of pulses in the clock synchronization signal S2 to identify the at least one marking pulse.

Still further in accordance with an embodiment of the present disclosure the encoding includes encoding the phase information in the clock synchronization signal S2 using a pattern of marking pulses responsively to a marking function, the method further including, finding, by the second network interface controller, a section of the clock synchronization signal S2 matching the pattern of marking pulses within a predefined correlation threshold, and wherein the timing includes timing the update of the time value responsively to the phase value where the matching section is detected in the clock synchronization signal S2.

Additionally, in accordance with an embodiment of the present disclosure the marking function is based on a Walsh function.

Moreover in accordance with an embodiment of the present disclosure, the method includes connecting the second network interface controller with a third network interface controller, connecting at least one third network interface port of the third network interface controller to a third PDN, providing a clock synchronization signal S3 responsively to the clock synchronization signal S2, sending the clock synchronization signal S3 to the third network interface controller, receiving the clock synchronization signal S3 by the third network interface controller, updating a physical hardware clock (PHC) in the third network interface controller with a time value T3 responsively to the received clock synchronization signal S3, and sending another clock synchronization signal to network nodes in the third PDN responsively to the time value T3 such that the third network interface controller acts as a master clock in the third PDN.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

In some systems, there may be respective network interface controllers (NICs) connected to respective servers in a single rack, for example, or multiple NICs connected to a single server, for example, to accommodate high bandwidth and/or when the server arrangement functions as a gateway between multiple networks. For example, a first NIC may be connected to one network, and a second NIC may be connected to a second network. The network connected to the first NIC may be a PTP synchronized network, whereas the network connected to the second NIC is not. Providing PTP synchronization separately in both networks may be a costly solution to the problem.

Embodiments, of the present invention provide time synchronization (frequency and phase) between NICs (e.g., NIC1 and NIC2) to transfer PTP functionality from the PTP synchronized network (connected to NIC1) to the non-PTP synchronized network (connected to NIC2) so that NIC2 acts as a PTP master for the network it is connected to, in effect making the non-PTP synchronized network a PTP synchronized network.

As the NICs are two discrete hardware devices it is a challenge to synchronize them in an accurate manner. Connecting the NICs via their network interface ports and synchronizing over Ethernet is generally not a workable solution as the network interface ports are a limited resource used for general network traffic and most network administrators would not be willing to give up network interface ports for this purpose. Connecting the NICs via other technologies through the server, e.g., Peripheral Component Interconnect Express (PCIe), QuickPath Interconnect (QPI) Nvlink, Compute Express Link (CXL), Cache Coherent Interconnect for Accelerators (CCIX), etc., will generally not provide a fast or accurate synchronization, for example, the jitter may be in the order of milliseconds.

Embodiments of the present invention solve the above problems by connecting the NICs via a connection (e.g., dedicated connection) such as via their coaxial radio-frequency (RF) connectors (e.g., SMA (SubMiniature version A) connectors) using a coaxial RF cable (e.g., an SMA cable such as RG316 cable) or any suitable connection (e.g., any suitable cable or interconnect) and synchronizing the time of NIC1 to NIC2 over the dedicated connection, e.g., coaxial RF cable. The coaxial RF connectors are commonly referred to as PPS out and PPS in, where PPS means pulses per second. The PPS out and in connectors are typically used for diagnostics to measure the accuracy between two clocks or for receiving a GPS signal. Therefore, using the coaxial RF connectors for clock synchronization is not generally going to impact the functionality of the NICs. Embodiments of the present invention use the coaxial RF connectors to connect the NICs while raising the pulse per second usage to thousands of PPS (KPPS) or millions of PPS (MPPS).

In some embodiments, NIC1 receives time synchronization signals from a master clock in its network and uses the signals to update its PHC. NIC generates a time synchronization signal for sending to NIC2 over the coaxial RF cable to provide NIC2 with both frequency and phase information. Other phase information may be sent out-of-band to the time synchronization signal (for example, via PCIe interfaces of the NIC and via one or more CPUs of the server(s) hosting the NICs). NIC2 decodes the frequency information and the phase information from the received time synchronization signal optionally in conjunction with the out-of-band phase information. NIC2 then updates its PHC based on the decoded frequency and phase information and also acts as a master clock, e.g., PTP master, for its network.

In some embodiments, a computer apparatus, includes at least one central processing unit (CPU), NIC1, and NIC2. NIC1 includes one or more network interface port(s) which transfer data with a first packet-data network (PDN). The first PDN includes a master clock which provides a clock synchronization signal S1. NIC1 also includes a coaxial RF connector connected to a coaxial RF cable, and a PHC (e.g., PHC1) which maintains a time value T1 responsively to the received clock synchronization signal S1. The term "time value", as used in the specification and claims, is defined to include a phase value and/or a frequency value. NIC1 also includes a clock controller which generates a clock synchronization signal S2 responsively to the received clock synchronization signal S1 and sends the clock synchronization signal S2 over the coaxial RF connector and the coaxial RF cable. NIC2 includes a coaxial RF connector connected to the coaxial RF cable to receive the clock synchronization signal S2, and one or more network interface port(s) to transfer data with a second PDN. NIC2 also includes a PHC (e.g., PHC2), and a clock controller which receives the clock synchronization signal S2, updates PHC2 with a time value T2 responsively to the received clock synchronization signal S2, and sends another clock synchronization signal to network nodes in the second PDN responsively to the time value T2 such that the NIC2 acts as a master clock in the second PDN.

In some embodiments, the clock controller of NIC1 encodes frequency information in the clock synchronization signal S2 and encodes phase information in the clock synchronization signal S2 using at least one marking pulse, for example, by modulating a width and/or an amplitude of at least one pulse of the clock synchronization signal S2 or by adding a pattern of marking pulses to the clock synchronization signal S2, using a suitable marking function, for example, but not limited to, a Walsh function. In some embodiments, the clock synchronization signal S2 has a frequency, which is set responsively to the received clock synchronization signal S1 (i.e., the frequency information in the clock synchronization signal S2 or according to the frequency of time value T1).

The clock controller of NIC2 decodes the frequency information from the clock synchronization signal S2 and decodes the phase information from the clock synchronization signal S2 responsively to the marking pulse(s). As part of the decoding, the clock controller of NIC2 may measure a width and/or amplitude of pulses in the clock synchronization signal S2 to identify the marking pulse(s). When the marking pulses are encoded as a pattern, the clock controller of NIC2 finds a section of the clock synchronization signal S2 matching the pattern of marking pulses within a predefined correlation threshold.

In some embodiments, the clock controller of NIC1 generates a phase value signal indicative of a phase value of the time value T1 and sends the phase value signal to the clock controller of NIC2 out-of-band with the clock synchronization signal S2, for example, via the CPU of the server apparatus. The detection of the marking pulse(s) in the clock synchronization signal S2 by the clock controller of NIC2, triggers the clock controller of NIC2 to update PHC2 according to the phase value included in the phase value signal. In other words, the clock controller of NIC2 times an update of PHC2 based on the phase value (from the phase value signal) according to where the marking pulse(s) is detected in the clock synchronization signal S2, e.g., where the pulse with the modulated width and/or amplitude was found, or the section matching the pattern of marking pulses was found. Therefore, the phase value signal may be thought of as long-term phase information, and the marking pulse(s) as short-term phase information.

In some embodiments, more than two NICs may be chained together using the above method. For example, the PPS-out of NIC2 is connected to the PPS-in of another NIC (e.g., NIC3) by a coaxial RF cable and a time synchronization signal is sent from the NIC2 to the NIC3 so that NIC3 acts as a master clock (e.g., PTP master) for its network, and so on.

System Description

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Figure 1:
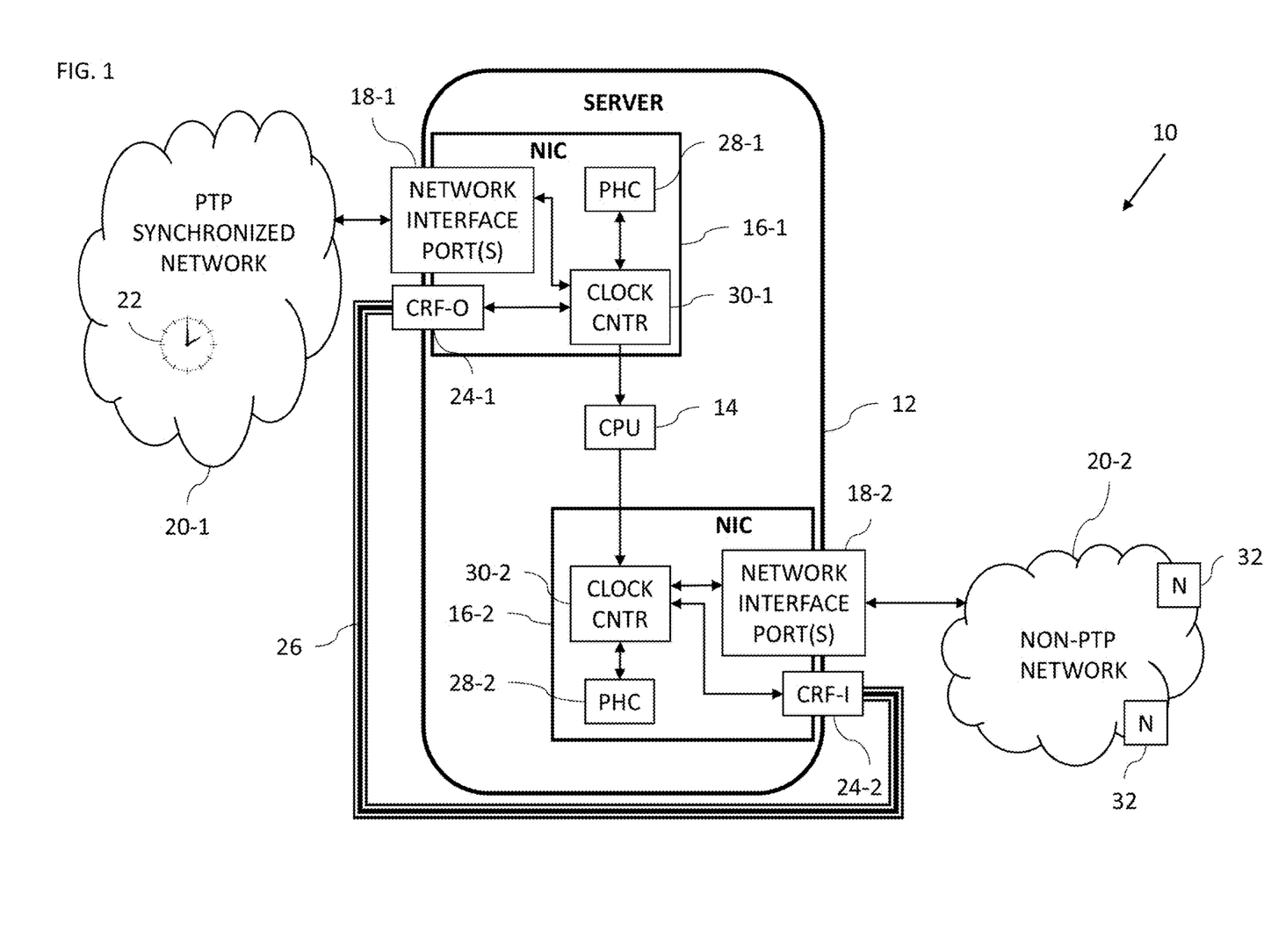
FIG. 1 is a block diagram view of a time synchronization system constructed and operative in accordance with an embodiment of the present invention.

Reference is now made to FIG. 1, which is a block diagram view of a time synchronization system 10 constructed and operative in accordance with an embodiment of the present invention. The time synchronization system 10 includes a computer server apparatus 12 including a central processing unit (CPU) 14, a network interface controller 16-1, and a network interface controller 16-2. The computer server apparatus 12 is shown as a single server. In some embodiments, the respective network interface controllers 16 may be disposed in respective servers, for example, in the same rack (not shown), having respective CPUs.

The network interface controller 16-1 includes one or more network interface ports 18-1 configured to transfer data between the CPU 14 and a packet-data network (PDN) 20-1. The PDN 20-1 includes a master clock 22 configured to provide a clock synchronization signal S1, typically including frequency and phase information according to any suitable standard, for example. PTP. The network interface controller 16-1 also includes a coaxial (radio-frequency) RF connector 24-1 (shown as CRF-O in FIG. 1) configured to be connected to a coaxial RF cable 26, and a physical hardware clock (PHC) 28-1 configured to maintain a time value T1 responsively to the clock synchronization signal S1. The coaxial RF connector 24-1 shown in FIG. 1 is a coaxial RF output connector. The network interface controller 16-1 may also include a coaxial RF input connector. The coaxial RF connector 24-1 and the coaxial RF cable 26 (e.g., RG316 cable) may be provided in accordance with any suitable standard, for example, but not limited to, SMA (SubMiniature version A).

The network interface controller 16-1 also includes a clock controller 30-1. The clock controller 30-1 is described in more detail with reference to FIG. 3. In practice, some or all of the functions of clock controller 30-1 may be combined in a single physical component or, alternatively, implemented using multiple physical components. These physical components may comprise hard-wired or programmable devices, or a combination of the two. In some embodiments, at least some of the functions of the clock controller 30-1 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The network interface controller 16-2 includes a coaxial RF connector 24-2 (shown as CRF-I in FIG. 1) configured to be connected to the coaxial RF cable 26, and one or more network interface ports 18-2 configured to transfer data between the CPU 14 and a PDN 20-2, which is different from the PDN 20-1. The coaxial RF connector 24-2 shown in FIG. 1 is a coaxial RF input connector. The network interface controller 16-1 may also include a coaxial RF output connector. Prior to being connected with the coaxial RF cable 26 and being synchronized by network interface controller 16-1, PDN-2 is a non-PTP synchronized network. The network interface controller 16-2 also includes a PHC 28-2, and a clock controller 30-2. The clock controller 30-2 is described in more detail with reference to FIG. 6. In practice, some or all of the functions of clock controller 30-2 may be combined in a single physical component or, alternatively, implemented using multiple physical components.

These physical components may comprise hard-wired or programmable devices, or a combination of the two. In some embodiments, at least some of the functions of the clock controller 30-2 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

In some embodiments, the coaxial RF connectors 24 may be replaced by any suitable connectors and/or interfaces and the coaxial RF cable 26 may be replaced by any suitable connection (e.g., cable and/or interconnect).

Figure 2:
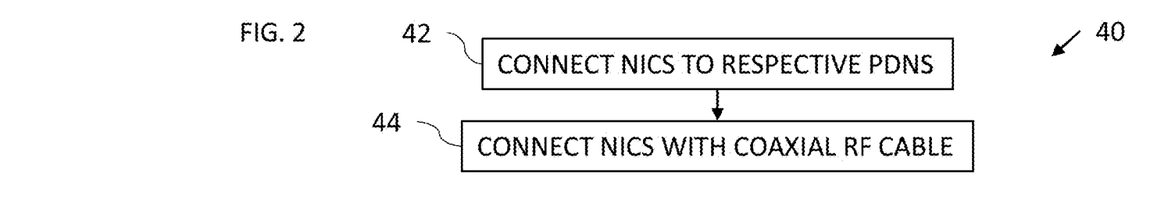
FIG. 2 is a flowchart including steps in a setup method of the system of FIG. 1.

Reference is now made to FIG. 2, which is a flowchart 40 including steps in a setup method of the system 10 of FIG. 1. Reference is also made to FIG. 1. As part of a setup method, the network interface port(s) 18-1 are connected (block 42) to the PDN 20-1 and the network interface ports 18-2 are connected to the PDN 20-2 by respective network cables. In some embodiments, the network interface ports 18-1 and/or network interface ports 18-2 may be connected to the respective PDNs 20 via one or more wireless connections. The coaxial RF connectors 24-1, 24-2 are connected (block 44) using the coaxial RF cable 26.

Figure 3:
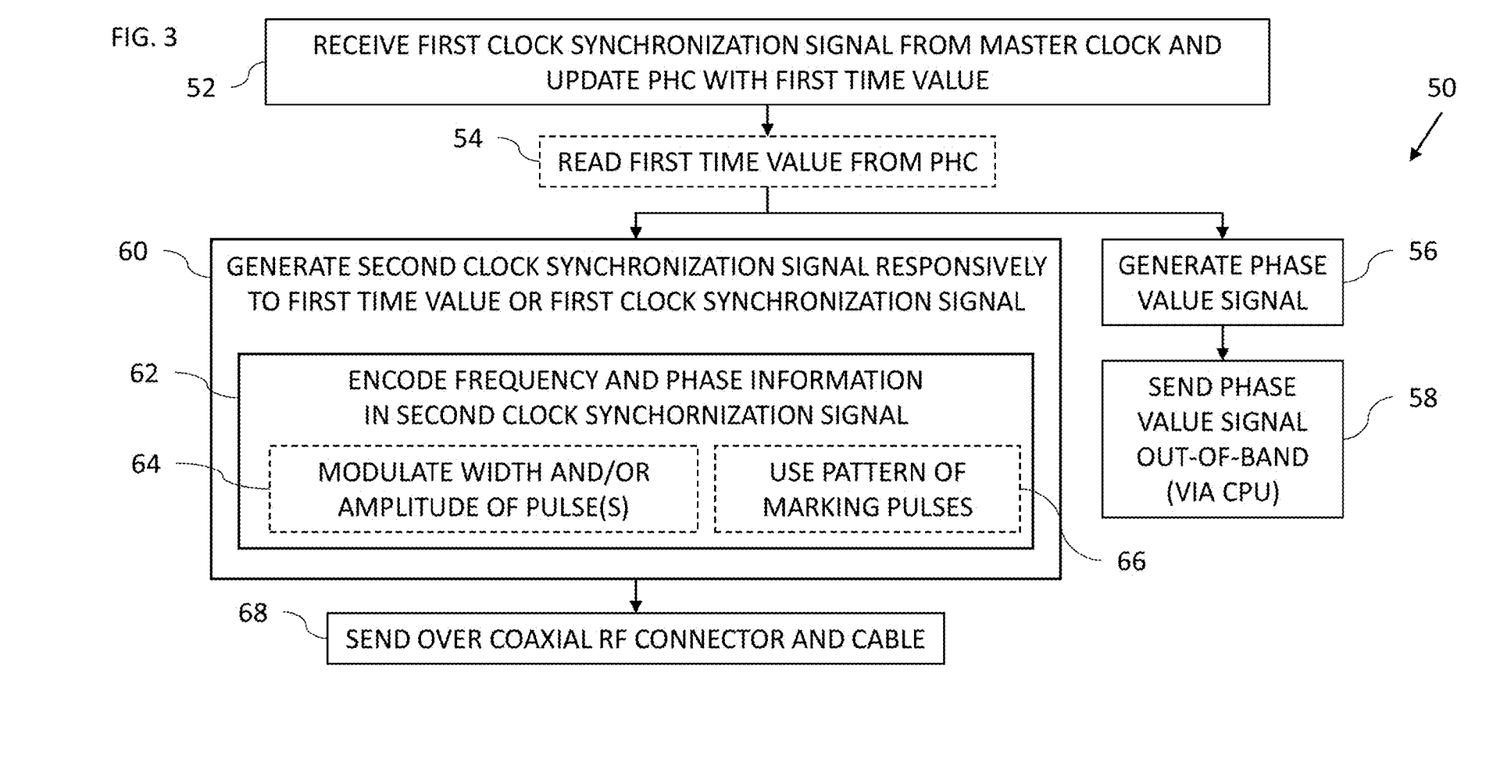
FIG. 3 is a flowchart including steps in a method performed by a network interface controller in the system of FIG. 1.

Reference is now made to FIG. 3, which is a flowchart 50 including steps in a method performed by the network interface controller 16-1 in the system 10 of FIG. 1. Reference is also made to FIG. 1. The clock controller 30-1 is configured to receive (block 52) the clock synchronization signal S1 provided by the master clock 22 and update the PHC 28-1 with the time value T responsively to the clock synchronization signal S1 in accordance with any suitable standard, for example, PTP.

The clock controller 30-1 is configured to convey the frequency and phase information in a single signal (a clock synchronization signal S2) or via two (or more) signals (the clock synchronization signal S2 and a phase value signal). In some embodiments, the clock synchronization signal S2 conveys short-term phase information and the phase value signal conveys longer-term phase information, as will be described in more detail below.

The phase value signal includes an indication of a future phase value of T (longer-term phase information). The clock synchronization signal S2 includes an indication of when the future phase value will occur (short-term phase information). For example, if T1 is retrieved and has a phase value P1, the phase value signal may be generated to indicate a phase value of P2 which equals P1 plus a given phase difference P' to allow time to signal the phase value P2 in the clock synchronization signal S2 and send the phase value signal to the clock controller 30-2. Longer-term may be considered a period of time which is longer than the latency to communicate between the clock controller 30-1 and the clock controller 30-2 via the CPU 14 of the computer server apparatus 12, for example.

The clock controller 30-1 is optionally configured to read (block 54) the time value T1 from the PHC 28-1. If T1 is still in memory there may be no need to read T1 from the PHC 28-1. The clock controller 30-1 is configured to generate (block 56) the phase value signal indicative of the phase value of the time value T1 at a future time (e.g., phase value P2). The clock controller 30-1 is configured to send (block 58) the phase value signal to the clock controller 30-2 out-of-band with the clock synchronization signal S2. In some embodiments, the clock controller 30-1 is configured to send the phase value signal to the second clock controller via the CPU 14 and respective communication bus interfaces (e.g., PCIe) (not shown) of the network interface controllers 16-1, 16-2.

The clock controller 30-1 is configured to generate (block 60) the clock synchronization signal S2 responsively to the read time value T1 or the received clock synchronization signal S (which provides T). The clock controller 30-1 is configured to encode (block 62) frequency information in the clock synchronization signal S2 according to the frequency of T1 (maintained by the PHC 28-1) or encoded in the clock synchronization signal S1. In some embodiments, the clock synchronization signal S2 has a frequency, which is set responsively to the received clock synchronization signal S1 (i.e., the frequency information in the clock synchronization signal S2 or according to the frequency of T1). For example, the clock synchronization signal S2 is generated to include pulses having a frequency equal to the frequency of T1. The clock controller 30-1 is configured to encode phase information in the clock synchronization signal S2 using at least one marking pulse. The marking pulse(s) may indicate the phase value (e.g., P2) or when the future phase value (e.g. P2) will occur. Encoding phase information in the clock synchronization signal S2 is described in more detail with reference to FIGS. 4 and 5.

Figure 4:
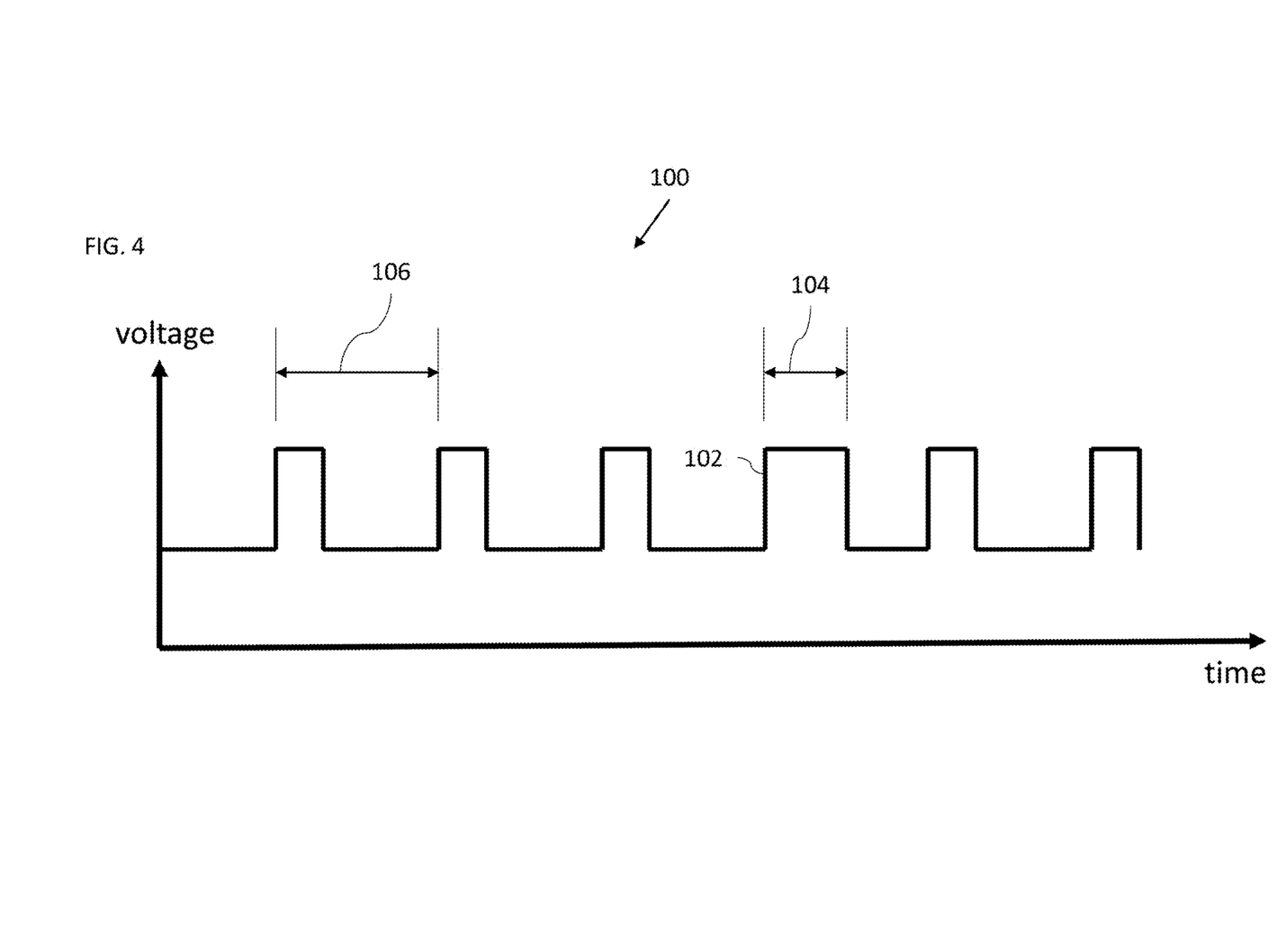
FIG. 4 is a schematic view of a clock synchronization signal for use in the system of FIG. 1.

Reference is now made to FIG. 4, which is a schematic view of a clock synchronization signal 100 for use in the system 10 of FIG. 1. Reference is also made to FIG. 3. The clock synchronization signal 100 is an example of the clock synchronization signal S2. The clock controller 30-1 (FIG. 1) is configured to encode the phase information in the clock synchronization signal S2 using at least one marking pulse 102 by modulating (block 64) a width (arrow 104) (i.e. modulating the duty cycle) and/or an amplitude of at least one pulse of the clock synchronization signal S2. FIG. 4 shows that the marking pulse 102 is wider than the other pulses in the clock synchronization signal 100 and may be identified by the clock controller 30-2 (FIG. 1) on receipt by sampling the clock synchronization signal 100 at suitably close intervals to identify wider pulses. The frequency of the clock synchronization signal 100 may be set according to the cycle length of the pulses (arrow 106).

Figure 5:
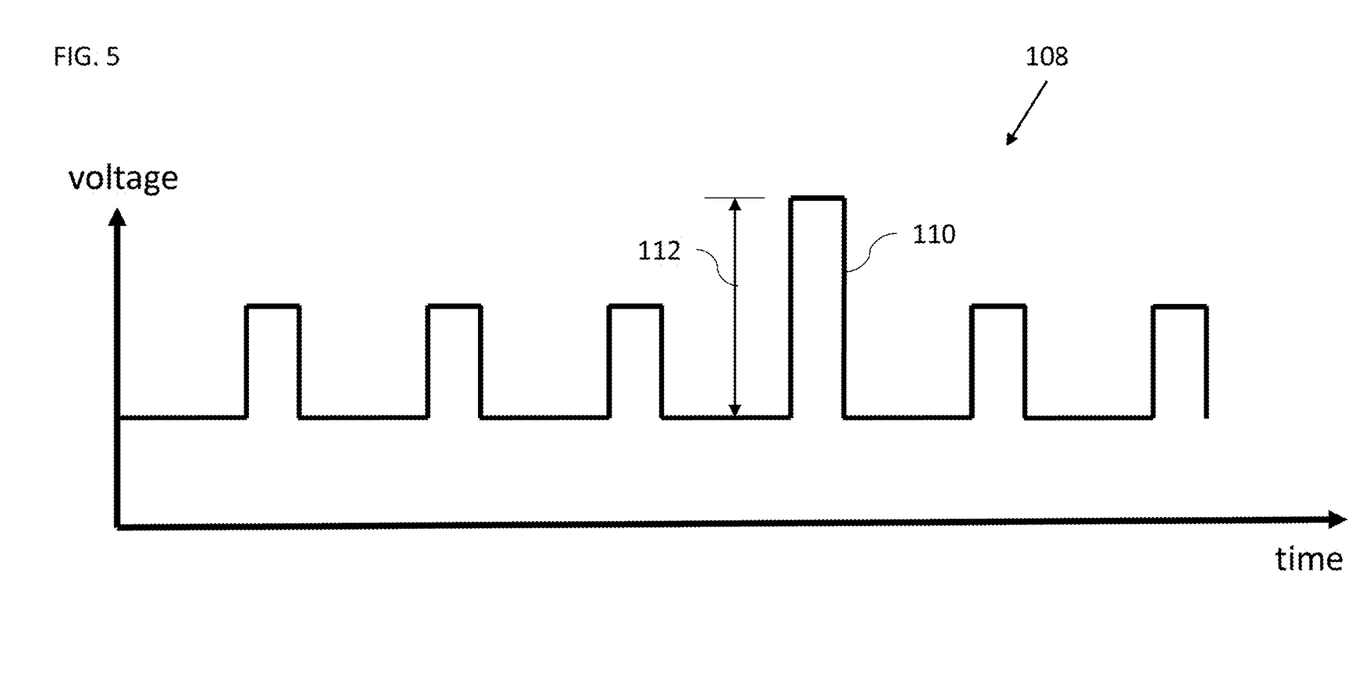
FIG. 5 is a schematic view of an alternative clock synchronization signal for use in the system of FIG. 1.

Reference is now made to FIG. 5, which is a schematic view of an alternative clock synchronization signal 108 for use in the system 10 of FIG. 1. The clock synchronization signal 108 is an example of the clock synchronization signal S2 including a marking pulse 110 with an amplitude (arrow 112), which is greater than that of the other pulses.

Reference is again made to FIGS. 1 and 3. In some embodiments, to minimize the sensitivity to noise interface which may cause synchronization problems due to false detection of the marking pulse(s), the clock controller 30-1 is configured to encode the phase information in the clock synchronization signal S2 using a pattern (block 66) of marking pulses responsively to a marking function. The clock controller 30-2 then finds a match (or a close match) to the pattern in the received clock synchronization signal S2 to determine when to update the PHC 28-2 with the phase value received in the phase value signal. Identifying the pattern is described in more detail with reference to FIG. 6.

In some embodiments, the pattern may be encoded according to any suitable marking function, for example, based on a Walsh-function, in which a value of "0" is represented in X % of the duty cycle and a value of "1" is represented in "(100−X)"% of the duty cycle, thereby benefitting from processing gain. One example of X is 33. However, X may take any suitable value as long as the pulses can still be detected by the available detection hardware and software. In some embodiments, at least 32 bits are used to encode the pattern. With 32 bits, in a given "period" there will be at least 64 cycles of the clock synchronization signal S2. An example of a 32-bit Walsh function providing the pattern of marking pulses is: 0011, 1100, 1100, 0011, 1100, 0011, 0011, 1100.

Using a pattern minimizes the sensitivity to noise by removing the dependency on identifying the marking pulse in a specific cycle. The benefit of using a Walsh function is that its autocorrelation function maximizes with the correct sampling phase, and its cross-correlation to the other functions is by-definition zero. The processing-gain generally depends on the number of bits which are participating in the Walsh-function vector.

The clock controller 30-1 is configured to send (block 68) the clock synchronization signal S2 over the coaxial RF connector 24-1 and over the coaxial RF cable 26 to the clock controller 30-2 via the coaxial RF connector 24-2. In some embodiments, the clock controller 30-1 is configured to send the clock synchronization signal S2 via a dedicated connection between the network interface controllers 16, for example, using a shielded connection, which is external or internal to the computer server apparatus 12 or a server rack.

Figure 6:
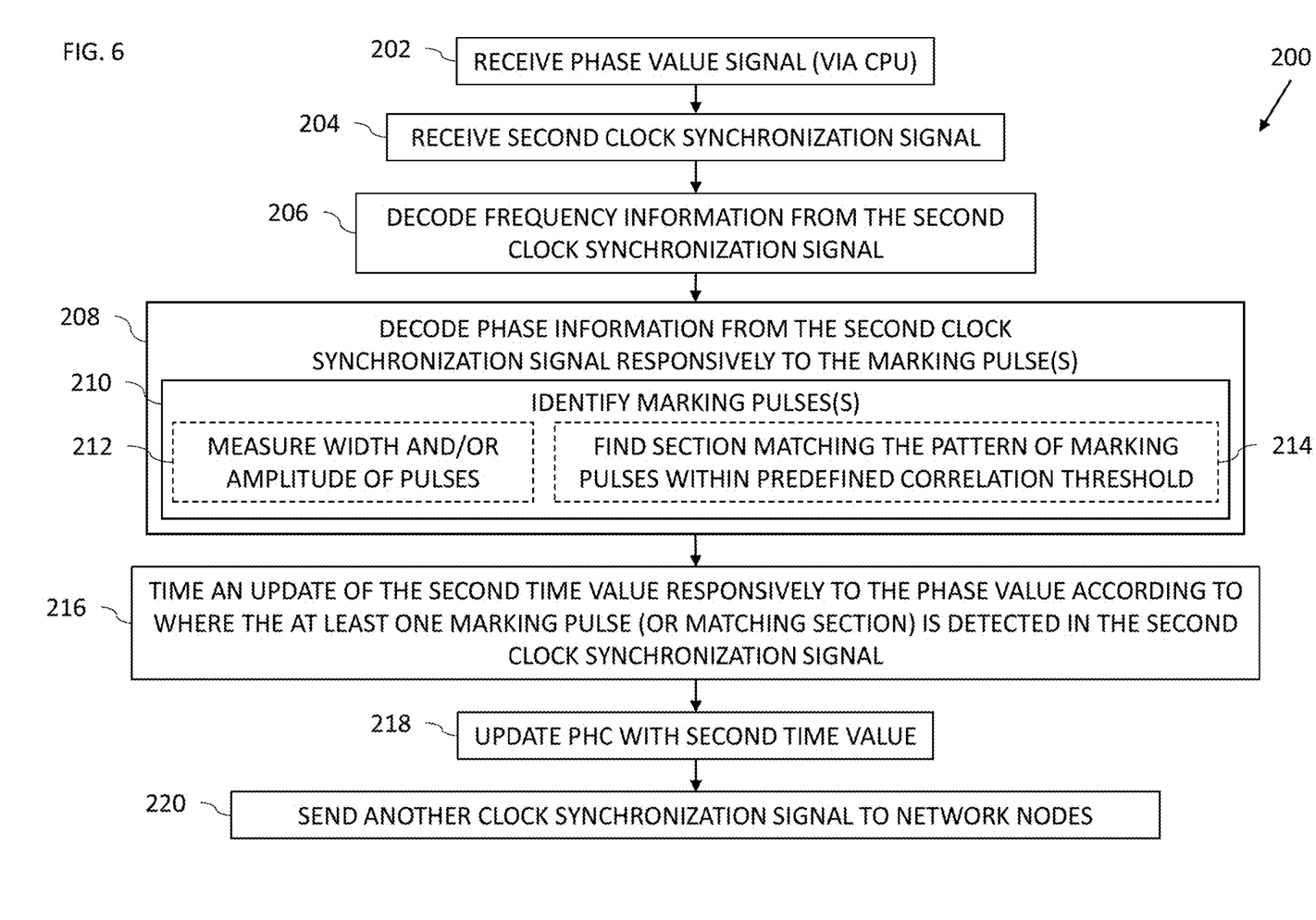
FIG. 6 is a flowchart including steps in a method performed by another network interface controller in the system of FIG. 1.

Reference is now made to FIG. 6 is a flowchart 200 including steps in a method performed by the network interface controller 16-2 in the system 10 of FIG. 1. Reference is also made to FIG. 1.

The clock controller 30-2 is configured to receive (block 202) the phase value signal, typically out-of-band with the clock synchronization signal S2, for example, via the CPU 14.

The clock controller 30-2 is configured to receive (block 204) the clock synchronization signal S2 from the coaxial RF connector 24-2. The clock controller 30-2 is configured to decode (block 206) the frequency information from the clock synchronization signal S2, for example, based on the frequency of the pulses in the clock synchronization signal S2. The clock controller 30-2 is configured to decode (block 208) the phase information from the clock synchronization signal S2 responsively to the marking pulse(s). As previously described, the phase information may include the phase value or a marker of the phase value.

As a sub-step of the step of block 208, the clock controller 30-2 is configured to identify (block 210) the marking pulse(s) in the clock synchronization signal S2. When the marking pulse(s) is (are) encoded by modulating a width and/or amplitude of the marking pulse(s), the clock controller 30-2 is configured to measure (block 212) a width and/or amplitude of pulses in the clock synchronization signal S2 to identify the marking pulse(s).

Figure 7:
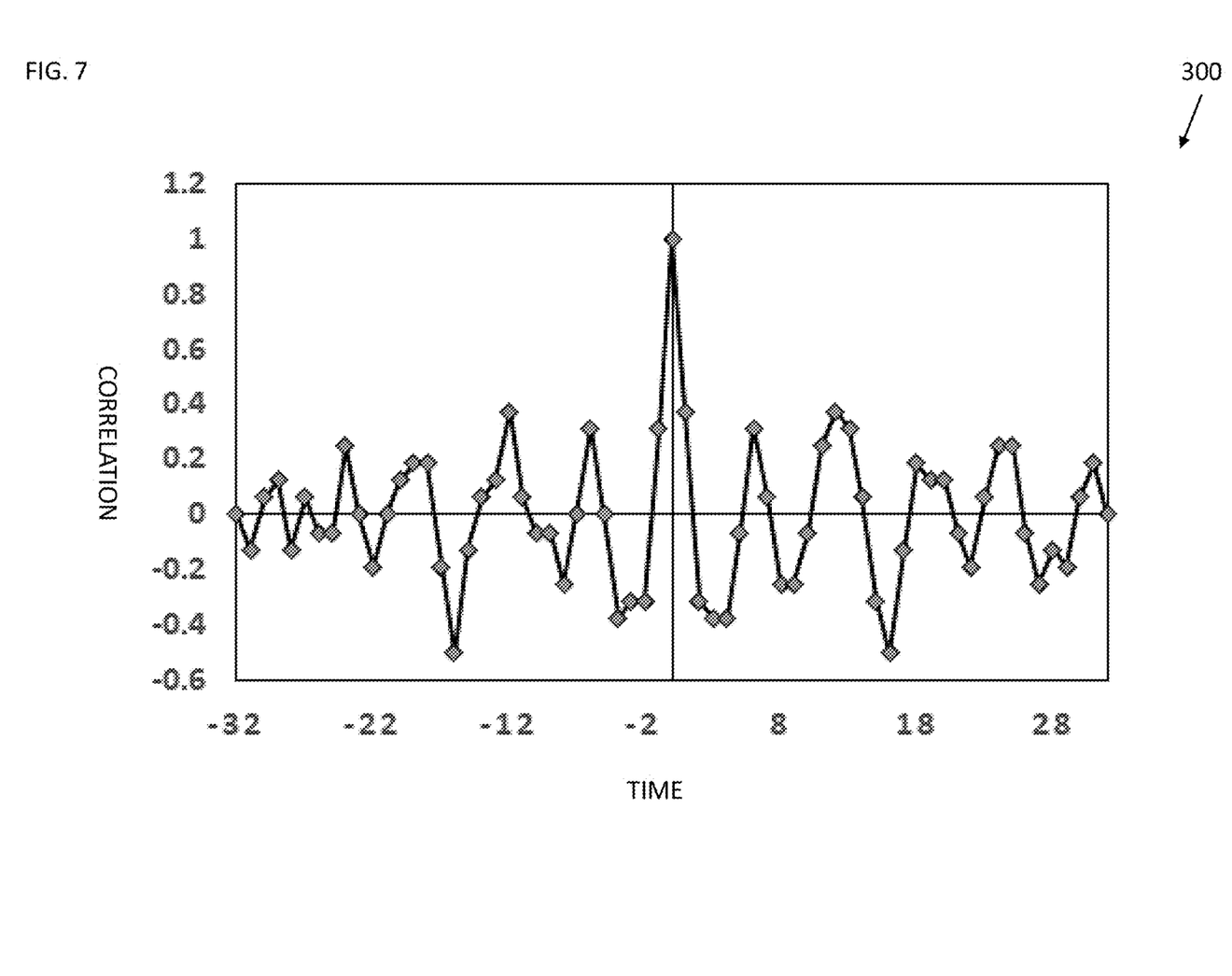
FIG. 7 is a schematic view of a correlation graph illustrating a step of the flowchart of FIG. 6.

Reference is now made to FIG. 7 is a schematic view of a correlation graph 300 illustrating a step of the flowchart 200 of FIG. 6. Reference is also made to FIG. 6. The clock controller 30-2 is configured to find (block 214) a section of the clock synchronization signal S2 matching the pattern of marking pulses within a predefined correlation threshold. The clock controller 30-2 typically compares different sections (or windows) of the clock synchronization signal S2 until a section is found having a correlation with the pattern above the predefined threshold. The predefined correlation threshold may be set to any suitable value. The threshold may depend on the number of bits in the pattern and/or the marking function used. When a Walsh function is used with a 32-bit pattern, such as "0011, 1100, 1100, 0011, 1100, 0011, 0011, 1100", the threshold correlation is close to 1 even when several of the bits are incorrectly identified. Therefore, in such a case the threshold may be set at 0.9 or 0.95. Any suitable pattern may be used. The correlation graph 300 shows the correlation between the above 32-bit Walsh function pattern and a clock synchronization signal at various times in the signal. The signal includes the same 32-bit Walsh function pattern mentioned above without any changes, and other bits not representative of the Walsh function pattern, such as: 0101, 0101, 1010, 1010, 1010, 1010, 0101, 0101. It can be seen that around time 0, where the 32-bit pattern is embedded in the signal, the correlation is 1, whereas at other times the correlation is less than 0.4. Any suitable arrangement of bits may be used for the bits not representative of the Walsh function, for example, 01 repeating. The bits may be selected to provide a low cross-correlation with the bits of the Walsh function.

Reference is again made to FIGS. 1 and 6. The clock controller 30-2 is configured to time (block 216) an update of the time value T2 of the PHC 28-2 responsively to the phase value according to where the marking pulse(s) or the matching section (when a pattern of marking pulses is used) is detected in the clock synchronization signal S2. The clock controller 30-2 is configured to update (block 218) the PHC 28-2 with the time value T2 responsively to the received clock synchronization signal S2 and the phase value signal. For example, if the phase value in the phase value signal is equal to P2 and the frequency of the clock synchronization signal S2 is equal to F, the clock controller 30-2 is configured to update the time value T2 of the PHC 28-2 with a phase equal to P2 and with a frequency of F, when the marking pulses(s) are identified in the clock synchronization signal S2.

The clock controller 30-2 is configured to send (block 220) another clock synchronization signal (for example, based on a suitable standard, such as PTP) to network nodes 32 in the PDN 20-2 responsively to the time value T2 such that the network interface controller 16-2 is configured to act as a master clock in the PDN 20-2. The clock controller 30-2 may be configured to read the time value T2 from the PHC 28-2 and send T2 to the network nodes 32 encoded in the time synchronization signal according to any suitable standard, e.g., PTP.

Figure 8:
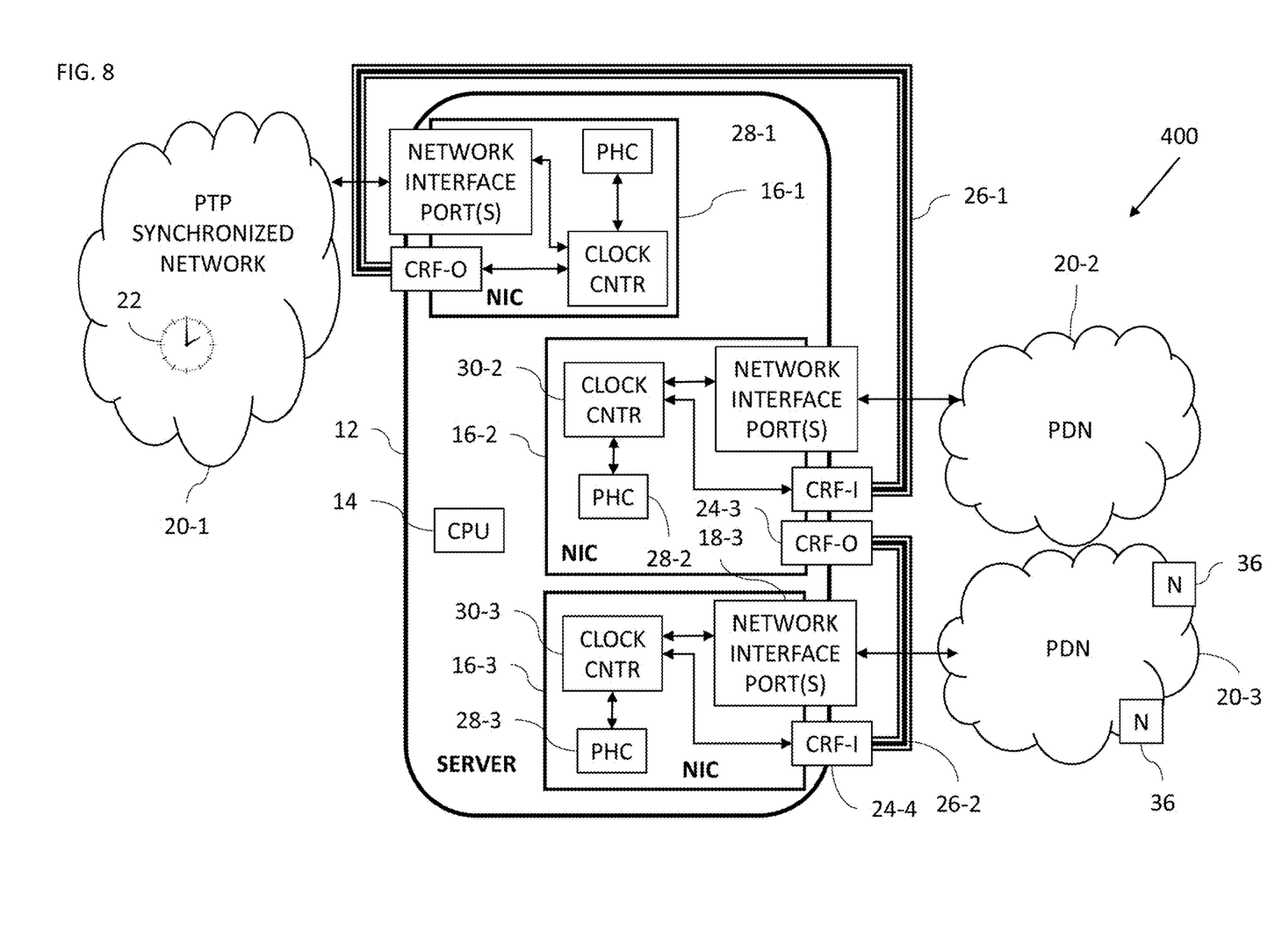
FIG. 8 is a block diagram view of a time synchronization system constructed and operative in accordance with an alternative embodiment of the present invention.

Reference is now made to FIG. 8 is a block diagram view of a time synchronization system 400 constructed and operative in accordance with an alternative embodiment of the present invention. The time synchronization system 400 is substantially the same as the time synchronization system 10 of FIGS. 1-7 except for the following differences. The time synchronization system 400 includes more than two network interface controllers 16 chained together using coaxial RF cables 26 between the network interface controllers 16 so that one of the network interface controllers 16 generates a time synchronization signal for sending via the respective coaxial RF cable 26 to another network interface controller 16, which then updates its PHC 28 and becomes a master clock (e.g., PTP master) for its PDN 20. The synchronized network interface controller 16 then generates a time synchronization signal for sending via the respective coaxial RF cable 26 to another network interface controller 16, which then updates its PHC 28 and becomes a master clock (e.g., PTP master) for its PDN 20, and so on. FIG. 8 shows three network interface controllers 16, but any suitable number of network interface controllers 16 may be chained in this manner.

In the time synchronization system 400, the network interface controller 16-1 is connected to the network interface controller 16-2 using a coaxial RF cable 26-1. The network interface controller 16-2 includes another coaxial RF connector 24-3 configured to be connected to a coaxial RF cable 26-2. The clock controller 30-2 is configured to provide a clock synchronization signal S3 responsively to the clock synchronization signal S2 and send the clock synchronization signal S3 over the coaxial RF connector 24-3 and over the coaxial RF cable 26-2 to a network interface controller 16-3. In some embodiments, the clock synchronization signal S3 may be equal to the clock synchronization signal S2. The clock controller 30-2 may generate a phase value signal to send to the network interface controller 16-3 out-of-band with the clock synchronization signal S3. In some embodiments, the network interface controller 16-1 may send the phase value signal that it generates to all the network interface controllers 16 in the computer server apparatus 12.

The network interface controller 16-3 includes a coaxial RF connector 24-4 configured to be connected to the coaxial RF cable 26-2, and one or more network interface port 18-3 configured to transfer data between the CPU 14 and a PDN 20-3. The network interface controller 16-3 also includes a PHC 28-3, and a clock controller 30-3, which is configured to: receive the clock synchronization signal S3 from the coaxial RF connector 24-4; update the PHC 28-3 with a time value T3 responsively to the received clock synchronization signal S3; send a clock synchronization signal (e.g., according to any suitable standard, such as PTP) to network nodes 36 in the PDN 20-3 responsively to the time value T3 (e.g., based on the time value T3 computed from the received clock synchronization signal S3 or based on a clock reading of the PHC 28-3) such that the network interface controller 16-3 is configured to act as a master clock (e.g., PTP master) in the PDN 20-3.

In some embodiments, the coaxial RF connectors 24 may be replaced by any suitable connectors and/or interfaces and the coaxial RF cables 26 may be replaced by any suitable connections (e.g., cables and/or interconnects).

The computer server apparatus 12 is shown as a single server. In some embodiments, the respective network interface controllers 16 may be disposed in respective servers, for example, in the same rack (not shown).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A computer apparatus, comprising:
a first network interface controller including:
at least one first network interface port configured to transfer data with a first packet-data network (PDN), the first PDN including a master clock configured to provide a clock synchronization signal S1;
a first connector configured to be connected to a connection;
a first physical hardware clock (PHC) configured to maintain a time value T1 responsively to the clock synchronization signal S1; and
a first clock controller configured to: generate a clock synchronization signal S2 responsively to the received clock synchronization signal S1, the clock synchronization signal S2 having a frequency, which is set responsively to the received clock synchronization signal S1; and send the clock synchronization signal S2 over the first connector and over the connection to a second network interface controller; and
the second network interface controller including:
at least one second network interface port configured to transfer data with a second PDN different from the first PDN;
a second connector configured to be connected to the connection;
a second PHC; and
a second clock controller configured to: receive the clock synchronization signal S2 from the second connector; update the second PHC with a time value T2 responsively to the received clock synchronization signal S2; send another clock synchronization signal to network nodes in the second PDN responsively to the time value T2 such that the second network interface controller is configured to act as a master clock in the second PDN.

2. The apparatus according to claim 1, wherein:
the connection includes a coaxial radio-frequency (RF) cable;
the first connector includes a first coaxial RF connector configured to be connected to the coaxial RF cable;
the first clock controller is configured to send the clock synchronization signal S2 over the first coaxial RF connector and over the coaxial RF cable;
the second connector includes a second coaxial RF connector configured to be connected to the coaxial RF cable; and
the second clock controller is configured to receive the clock synchronization signal S2 from the second coaxial RF connector.

3. The apparatus according to claim 2, further comprising the coaxial RF cable connected between the first coaxial RF connector and the second coaxial RF connector.

4. The apparatus according to claim 1, wherein the first clock controller is configured to: receive the clock synchronization signal S1; and update the first PHC with the time value T1 responsively to the clock synchronization signal S1.

5. The apparatus according to claim 1, wherein the first clock controller is configured to: read the time value T1 from the first PHC; and generate the clock synchronization signal S2 responsively to the read time value T1.

6. The apparatus according to claim 1, wherein:
the first clock controller is configured to: encode frequency information in the clock synchronization signal S2; and encode phase information in the clock synchronization signal S2 using at least one marking pulse; and
the second clock controller is configured to: decode the frequency information from the clock synchronization signal S2; and decode the phase information from the clock synchronization signal S2 responsively to the at least one marking pulse.

7. The apparatus according to claim 6, wherein:
the first clock controller is configured to: generate a phase value signal indicative of a phase value of the time value T1; and send the phase value signal to the second clock controller out-of-band with the clock synchronization signal S2; and the second clock controller is configured to time an update of the time value T2 responsively to the phase value according to where the at least one marking pulse is detected in the clock synchronization signal S2.

8. The apparatus according to claim 7, further comprising a central processing unit, wherein the first clock controller is configured to send the phase value signal to the second clock controller via the CPU.

9. The apparatus according to claim 7, wherein:

the first clock controller is configured to encode the phase information in the clock synchronization signal S2 using the at least one marking pulse by modulating a width and/or an amplitude of at least one pulse of the clock synchronization signal S2; and the second clock controller is configured to measure a width and/or amplitude of pulses in the clock synchronization signal S2 to identify the at least one marking pulse.

10. The apparatus according to claim 7, wherein:

the first clock controller is configured to encode the phase information in the clock synchronization signal S2 using a pattern of marking pulses responsively to a marking function; and the second clock controller is configured to: find a section of the clock synchronization signal S2 matching the pattern of marking pulses within a predefined correlation threshold; and time the update of the time value T2 responsively to the phase value according to where the matching section is detected in the clock synchronization signal S2.

11. The apparatus according to claim 10, wherein the marking function is based on a Walsh function.

12. The apparatus according to claim 1, wherein: the second network interface controller includes another connector configured to be connected to a second connection; and the second clock controller is configured to: provide a clock synchronization signal S3 responsively to the clock synchronization signal S2; and send the clock synchronization signal S3 over the other connector and over the second connection, the apparatus further comprising a third network interface controller including:

a third connector configured to be connected to the second connection;

at least one third network interface port configured to transfer data with a third PDN;

a third PHC; and a third clock controller configured to: receive the clock synchronization signal S3 from the third connector; update the third PHC with a time value T3 responsively to the received clock synchronization signal S3; send a clock synchronization signal to network nodes in the third PDN responsively to the time value T3 such that the third network interface controller is configured to act as a master clock in the third PDN.

13. A method of time synchronization, comprising:

connecting a first network interface controller with a second network interface controller using a connection;

connecting at least one first network interface port of the first network interface controller to a first packet-data network (PDN);

connecting at least one second network interface port of the second network interface controller to a second PDN;

receiving a clock synchronization signal S1 from a master clock in the first PDN over the at least one first network interface port;

generating by the first network interface controller a clock synchronization signal S2 responsively to the received clock synchronization signal S1, the clock synchronization signal S2 having a frequency, which is set responsively to the received clock synchronization signal S1;

sending the clock synchronization signal S2 to the second network interface controller;

receiving the clock synchronization signal S2 by the second network interface controller;

updating a physical hardware clock (PHC) in the second network interface controller with a time value responsively to the received clock synchronization signal S2; and sending another clock synchronization signal to network nodes in the second PDN responsively to the time value such that the second network interface controller acts as a master clock in the second PDN.

14. The method according to claim 13, further comprising connecting the first network interface controller with the second network interface controller using a coaxial radio-frequency (RF) cable, and wherein the sending includes sending the clock synchronization signal S2 over the coaxial RF cable.

15. The method according to claim 13, further comprising updating a PHC of the first network interface with a time value responsively to the clock synchronization signal S1.

16. The method according to claim 15, further comprising: reading the time value from the PHC of the first network interface controller; and generating the clock synchronization signal S2 responsively to the read time value.

17. The method according to claim 13, further comprising:

encoding by the first network interface controller: frequency information in the clock synchronization signal S2; and phase information in the clock synchronization signal S2 using at least one marking pulse; and decoding by the second network interface controller: the frequency information from the clock synchronization signal S2; and the phase information from the clock synchronization signal S2 responsively to the at least one marking pulse.

18. The method according to claim 17, further comprising:

generating by the first network interface controller a phase value signal indicative of a phase value;

sending the phase value signal to the second network interface controller out-of-band with the clock synchronization signal S2; and timing an update of the time value responsively to the phase value according to where the at least one marking pulse is detected in the clock synchronization signal S2.

19. The method according to claim 18, wherein the encoding includes encoding the phase information in the clock synchronization signal S2 using the at least one marking pulse by modulating a width and/or an amplitude of at least one pulse of the clock synchronization signal S2, and the method further comprising measuring, by the second network interface controller, a width and/or amplitude of pulses in the clock synchronization signal S2 to identify the at least one marking pulse.

20. The method according to claim 18, wherein the encoding includes encoding the phase information in the clock synchronization signal S2 using a pattern of marking pulses responsively to a marking function, the method further comprising, finding, by the second network interface controller, a section of the clock synchronization signal S2 matching the pattern of marking pulses within a predefined correlation threshold, and wherein the timing includes timing the update of the time value responsively to the phase value according to where the matching section is detected in the clock synchronization signal S2.

21. The method according to claim 20, wherein the marking function is based on a Walsh function.

22. The method according to claim 13, further comprising:
- connecting the second network interface controller with a third network interface controller;
- connecting at least one third network interface port of the third network interface controller to a third PDN;
- providing a clock synchronization signal S3 responsively to the clock synchronization signal S2;
- sending the clock synchronization signal S3 to the third network interface controller;
- receiving the clock synchronization signal S3 by the third network interface controller;
- updating a physical hardware clock (PHC) in the third network interface controller with a time value T3 responsively to the received clock synchronization signal S3; and
- sending another clock synchronization signal to network nodes in the third PDN responsively to the time value T3 such that the third network interface controller acts as a master clock in the third PDN.

* * * * *